(12) United States Patent
Garay et al.

(10) Patent No.: US 7,302,056 B2
(45) Date of Patent: Nov. 27, 2007

(54) METHOD AND SYSTEM FOR DETERMINING SEQUENCE PARAMETERS TO LIMIT CYCLE ATTACKS IN TIMED RELEASE CRYPTOGRAPHY

(75) Inventors: Juan A. Garay, West New York, NJ (US); Carl B. Pomerance, Watchung, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 835 days.

(21) Appl. No.: 10/610,803

(22) Filed: Jun. 30, 2003

(65) Prior Publication Data
US 2004/0264692 A1 Dec. 30, 2004

(51) Int. Cl.
*H04L 9/00* (2006.01)
*H04K 1/00* (2006.01)

(52) U.S. Cl. ...................................... 380/28

(58) Field of Classification Search ............... None
See application file for complete search history.

(56) References Cited

U.S. PATENT DOCUMENTS 6,804,782 B1* 10/2004 Qiu et al. ................. 713/194
6,813,358 B1* 11/2004 Di Crescenzo et al. ..... 380/280
7,020,281 B2* 3/2006 Vadekar et al. ............. 380/28

OTHER PUBLICATIONS

Friedlander, et al., "Period of the Power Generator and Small Values of Carmichael's Function," Math. Comp. 70 (2001), pp. 1591-1605.*
Friedlander, et al.,"Small Values of the Carmichael Function and Cryptographic Applications," Progress in Computer Science and Applied Logic, vol. 20, pp. 25-232, Birkhuser Verlag, Basel Switzerland, 2001.*
Howgrave-Graham, et al., "Hidden Number Problem with Hidden Multipliers, Timed-Release Crypto, and Noisy Exponentiation" Math. Comp. 72 (2001), pp. 1473-1485.*
Mao, Wenbo, "Timed-Release Cryptography", Springer-Verlag, 2001, pp. 342-357.*
Boneh and Noar, Timed Commitments (Extended Abstract), Advances in Cryptology, CRYPTO 2000, vol. 1880 of Lecture notes in Computer Science, pp. 236-254.*
Boneh and Naor, Timed Commitments (Extended Abstract), Advances in Cryptology, CRYPTO '00 vol. 1880 of Lecture Notes in Computer Science, pp. 236-254, Springer-Verlag 2000.
Garay and Jakobsson, "Timed Release of Standard Digital Signatures" Proceedings of Financial Cryptography '02, Matt Blaze (Ed.) vol. 2357 of Lecture Notes in Computer Science, pp. 168-182, Springer-Verlag 2002.
Garay and Pomerance, Timed Fair Exchange of Standard Signatures, Financial Cryptography '03 Rebecca Wright (Ed.) LNOS, Springer-Verlag (to appear), Guadeloupe—Jan. 2003.
Rivest, R., et al., Time-lock puzzles and timed-release Crypto, MIT/LCS/TR-683, 1996.

* cited by examiner

Primary Examiner—Christopher Revak

(57) ABSTRACT

A method and system for determining sequence parameters to limit cycle attack in time-line sequences associated with digital signature technologies is disclosed. The method comprises the steps of determining a pair of values associated with a modulus value for generating said sequence, wherein said values are non-equal prime numbers of a known size, selecting a root value of said sequence and selecting a third value for determining the order of said sequence. In one aspect of the invention, each of the pair of values used to determine the modulus is a safe prime number.

9 Claims, 3 Drawing Sheets

300

METHOD AND SYSTEM FOR DETERMINING SEQUENCE PARAMETERS TO LIMIT CYCLE ATTACKS IN TIMED RELEASE CRYPTOGRAPHY

RELATED APPLICATION

This application is related to co-pending U.S. patent application Ser. No. 10/611,711, entitled "Method and System for Fair Exchange of User Information," filed Jun. 30, 2003, and incorporated by reference herein.

FIELD OF THE INVENTION

This application is related to the field of electronic information exchange and more specifically to methods for limiting cycle attack of cryptographically-transformed data such as digital signatures.

BACKGROUND OF THE INVENTION

In the field of electronic commercial transactions, a guarantee that a certain operation will take a minimum amount of "time," understood here as a number of computational steps, enables a variety of electronic commerce applications, for example, the timed release of a payment (e.g., a mortgage payment), and/or the fair exchange of information items such as a digital signature. This guarantee is particularly important between the exchange of two parties, i.e., a committing party and a receiving party, when there are no trusted parties acting as intermediaries. In this case, the guarantee insures that either both parties obtain each other's commitment information or neither party obtains the other's commitment information. When both parties receive each other's commitment information substantially concurrently, then electronic contract signing may be completed by the transfer of each party's digital signature. However, when contract negotiations are abruptly terminated for failures, either intentional or unintentional, that may occur in the transmission, one party may obtain a significant advantage over the other party by the failure to complete the communication.

A leading candidate operation for preventing one party from obtaining a significant advantage over the other party is the use of modular exponentiation in the commitment information. Modular exponentiation is a well-researched operation believed not well suited for parallelization, i.e., operations by multiple computers or computing systems substantially concurrently. Indeed, timed sequences based on modular exponentiation, where the next element in the sequence is obtained from raising the previous element to a certain power, has been taught in Rivest, et al., "*Time-lock Puzzles and Timed-Release Crypto*," MIT/LCS/TR-683, 1996. Rivest teaches the construction of "time-lock puzzles" for encrypting data, where the goal is to design puzzles that are "intrinsically sequential." In using time-lock puzzles, putting computers to work together in parallel does not speed up the finding a solution to the puzzle. Using a function similar to that of Rivest, Boneh and Naor (See, D. Boneh and M. Naor, "*Timed Commitments (extended abstract)*," Advances in Cryptology, CRYPTO 2000, volume 1880 of Lecture Notes in Computer Science, pages 236-254, Springer-Verlag, 2000) defined the notion of verifiable timed commitments as an extension to the standard notion of commitments in which a potential forced opening phase permits the receiving party to recover, with significant effort, the committed value without the help of the committing party. Boneh and Naor show how to use timed commitments to realize a variety of applications involving time, including timed signatures of a special kind, and, in particular, contract signing. Boneh and Naor also show how to exchange Rabin and RSA signatures when the respective moduli coincide with the one used to build the timed sequence.

Efficient Boneh and Naor time structure generation is proposed by Garay and Jakobsson (see, Garay and Jakobsson "*Timed Release of Standard Digital Signatures,*" *Proceedings of Financial Cryptography '02*, Matt Blaze (Ed.), volume 2357 of Lecture Notes in Computer Science, pages 168-182, Springer-Verlag, 2002). Garay and Jakobsson teach how to generate, and use, time structures or time-lines together with blinding techniques for the timed release of standard signatures.

A further improvement in the construction of time-line based on modular exponentiation, referred to as a "mirrored time-line," is more fully disclosed in the concurrently-filed, co-pending related patent application Ser. No. 10/611,711, filed Jun. 30, 2003, entitled "Method and System for Fair Exchange of User Information" and in Garay and Pomerance, "Timed Fair Exchange of Standard Signatures," Financial Cryptography '03, Rebecca Wright (Ed.), LNCS, Springer-Verlag (to appear), Gosier, Guadeloupe, January 2003. In this improved time-line construction, a protocol is disclosed that allows for the fair exchange of standard signatures, and further enables each receiving party to recover, with limited effort, the committed value without the help of the committing party.

An important requirement in the time structures discussed above is that the underlying sequence that comprises the structure does not cycle. That is, the period of the sequence is large enough that there are no repeated values in the sequence. Otherwise with a sequence that repeats, no guarantees could be given that a time-line would be traversed sequentially. That is if a repeated value is observed in the sequence, then the party computing the sequence can skip intermediate values and jump ahead to the next repetition(s). Such operations, referred to as cycle attacks, are known to be are possible when the sequence period is shorter than the total number of elements in the sequence.

Efforts have been made in estimating the period of more general sequences of the form $g^{a^b}$ for arbitrary g, a and b. See for example, Friedlander, et al., "*Period of the Power Generator and Small Values of Carmichael's Function*," Math. Comp. 70 (2001), pp. 1591-1605 and Friedlander, et al.,"*Small Values of the Carmichael Function and Cryptographic Applications*," Progress in Computer Science and Applied Logic, Vol. 20, pp. 25-232, Birkhäuser Verlag, Basel Switzerland, 2001. However, the period of sequences used in association with a timed release, timed commitment, timed fair exchange or "mirrored-time-line" has not been considered before.

Accordingly, there is a need for a method and system that allows for the selection of parameters that construct time-line sequences having periods that are large enough to limit cycle attacks on the time-line.

SUMMARY OF THE INVENTION

A method and system for determining sequence parameters to limit cycle attacks in time-line sequences associated with timed release cryptography. The method comprises the steps of determining a pair of values associated with a modulus value for generating the sequence, wherein the values are non-equal prime numbers of a known size, selecting a root value of the sequence and selecting a third value for determining the order of the sequence. In one aspect of the invention, each of the values is a safe prime number. In another aspect of the invention, each value is a layered safe prime number.

Figure 1:
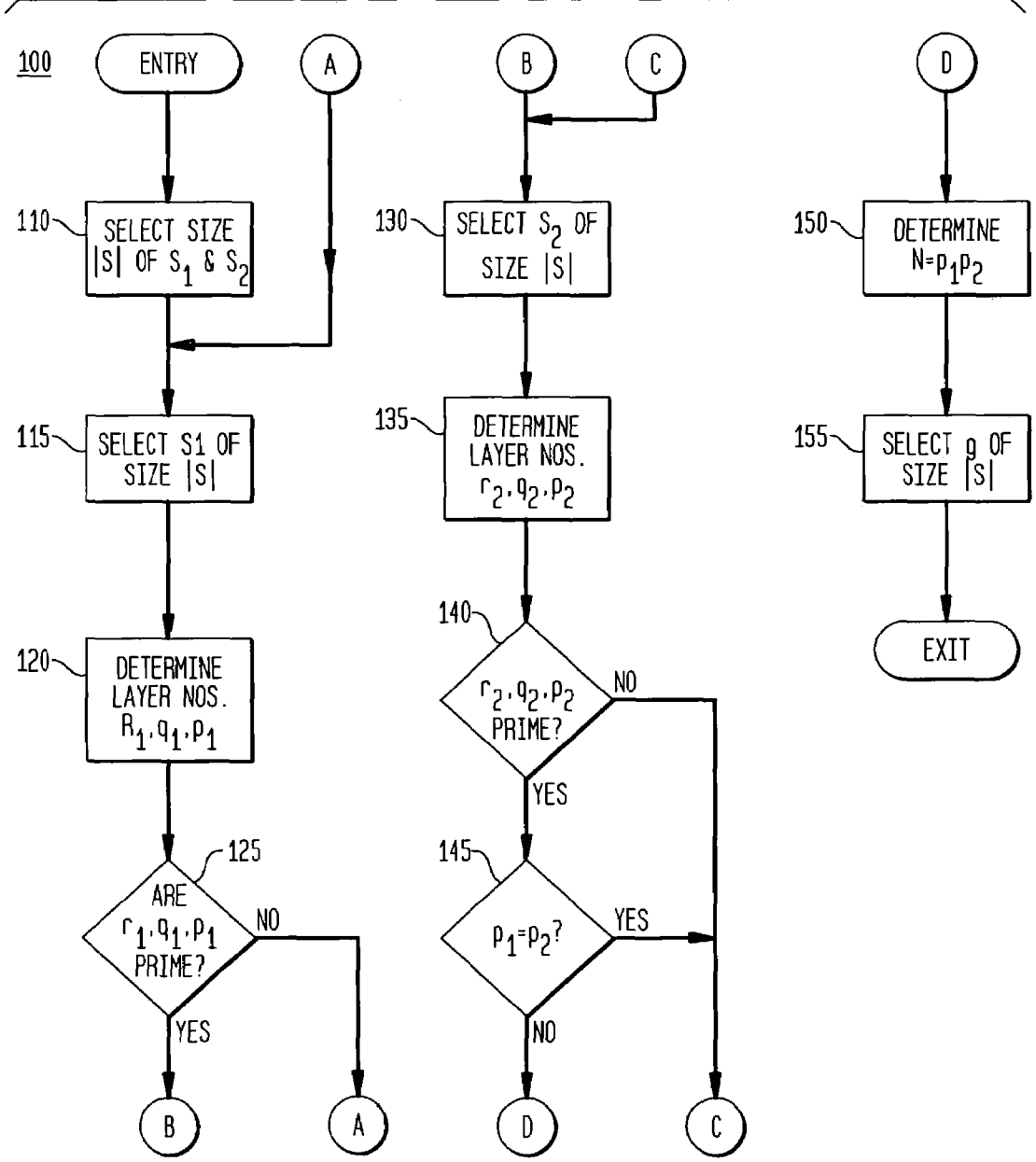
FIG. 1 illustrates a flow chart of a first exemplary process for generating sequence generating factors in accordance with the principles of the invention.

It is to be understood that these drawings are solely for purposes of illustrating the concepts of the invention and are not intended as a definition of the limits of the invention. The embodiments shown in FIGS. 1-3 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

A Garay and Jackobsson time-line sequence may be formulated as:

$$\left\{ g^2, g^4, g^{16}, \ldots, g^{2^{2^i}}, \ldots, g^{2^{2^{K-1}}}, g^{2^{2^K}} \right\} \pmod{N} \quad [1]$$

where,

N is a Blum integer in form of $N = p_1 p_2$;

g is an element of large odd order in the set of $Z_N^*$;

K is a known value representative of the order of the sequence;

$Z_N$ is the set of integers in $\{0, 1, \ldots N-1\}$;

$Z_N^*$ is the multiplicative group of $Z_N$, i.e., the numbers in $Z_N$ which are co-prime with N, and $p_1$ and $p_2$ are prime numbers congruent to 3 modulo 4.

The exemplary sequence shown in equation 1 may be represented in closed-form as:

$$\left( g^{2^{2^i}} \right)_{i=0}^{K} \mod(N) \quad [2]$$

A Garay and Pomerance time-line sequence may be represented, as disclosed in the co-pending related patent application Ser. No. 10/611,711, filed Jun. 30, 2003, in a closed form as:

$$\left( g^{2^{2^i}} \right)_{i=0}^{K} \mod(N); \text{ and} \quad [3]$$

$$\left( g^{2((2^{K+1})-(2^{K-n}))} \right)_{n=1}^{K} \mod(N). \quad [4]$$

In a preferred embodiment, K is selected to have a value of at least 80.

Periods for sequences represented by equation 2 and equations 3 and 4 may be determined, in part, as:

$$\text{Per}_2(g, n) = \text{Per}(2, \text{Per}_1(g, n)) = \text{Per}(2, \text{Per}(2, \text{Per}(g, n))) \quad [5]$$

where

Per(g, n) is the period of the sequence $g^i \mod(n), i \geq 0$;

$\text{Per}_1(g, n)$ is the period of the sequence $g^{2^i} \mod(n), i \geq 0$;

g is a non-zero integer; and n is a positive number.

When g and n are co-prime integers, Ord(g, n) may denote the multiplicative order of g in $Z^*_n$. More generally, Ord*(g, n) may be Ord(g, n*), where, n* is the largest divisor of n that is co-prime to g. In this case, the following is well-known (e.g., see Garay and Pomerance, "*Timed Fair Exchange of Standard Signatures,*" *Proceedings of Financial Crypto '03*, Rebbeca Wright (Ed.), Gossier, Guadeloupe, January 2003, Lecture Notes in Computer Science, Springer-Verlag, to appear, and references therein):

$$\text{Per}(g, n) = \text{Ord}^*(g, n) \quad [6]$$

One method for determining the period of the sequence shown in equation 2 is by constructing the modulus $N = p_1 p_2$, using values for $p_1$ and $p_2$ that are safe prime numbers. A prime number "p" is considered safe when it can be shown that $$\frac{(p-1)}{2}$$

is also a prime number. Furthermore, it is known that a prime number, q possessing the property that $2q+1=p$, is also prime is referred to as a Sophie Germain prime number. In another aspect, safe prime numbers may be layered by successively repeatly determining safe prime numbers. For example, values associated with modulus value N may be determined by repeatedly determining prime number of Sophie Germain form as:

$r_1 = s_1 + 1;$ $q_1 = r_1 + 1;$ and $p_1 = q_1 + 1 \quad [7]$

Although it is shown that value $p_1$ may be determined by three successive iterations, one skilled in the art would recognize that value $p_1$ may be determined by any number of successive iterations of prime number of Sophie Germain form.

FIG. 1 illustrates a flow chart of an exemplary process 100 for determining the parameters $p_1$ and $p_2$ of modulus value N in accordance with one aspect of the principles of the present invention. In this exemplary process, the number of bits needed to represent them the values, referred to as a "size" of the values and represented as |s| is obtained at block 110.

At block 115, a first value, in this example $s_1$, of size |s|, is selected. At block 120, the values of $r_1$, $q_1$ and $p_1$ are determined as:

$r_1 = 2s_1 + 1;$ $q_1 = 4s_1 + 3;$ and $p_1 = 8s_1 + 7 \quad [8]$

At block 125, a determination is made whether each of the determined values of $r_1$, $q_1$ and $p_1$ are prime numbers. If the answer is negative, then processing proceeds to block 115 for the selection of a new value for $s_1$. Preferably, $s_1$ is selected as a prime number. In a more preferred embodiment, $s_1$ is selected as a safe prime number.

However, if the answer is in the affirmative, then a value for $s_2$, also of size |s|, is selected at block 130. At block 135, the values associated with $r_2$, $q_2$ and $p_2$ are determined as:

$$r_2 = 2s_2 + 1;$$

$$q_2 = 4s_2 + 3; \text{ and}$$

$$p_2 = 8s_2 + 7 \quad [9]$$

At block 140, a determination is made whether each of the determined values of $r_2$, $q_2$ and $p_2$ are prime numbers. If the answer is negative, then processing proceeds to block 130 to select a new value for $s_2$. If, however, the answer is in the affirmative, then a determination is made, at block 145, whether the determined values of $p_1$ and $p_2$ are identical. If the answer is in the affirmative, then processing proceeds to block 130 to select a new value for $s_2$.

Otherwise, the value of modulus N is determined as the product of non-equal $p_1$ and $p_2$ at block 150. A root value, g, of size |s| is then selected at block 155. In one aspect of the invention, the value of g is selected randomly. In another aspect of the invention, the value of g is selected, preferably, such that $(g^3 - g)$ is co-prime to N.

Figure 2:
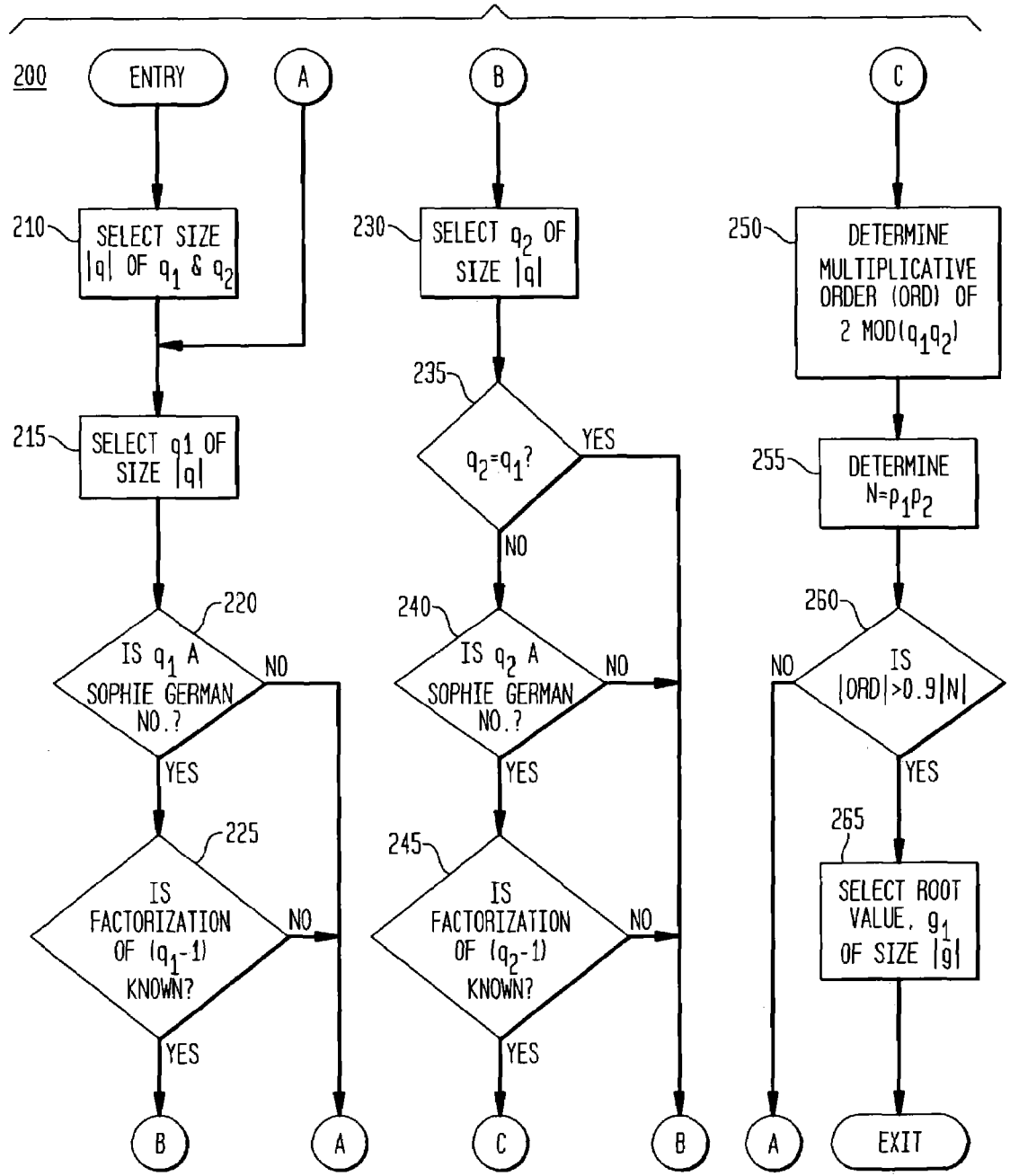
FIG. 2 illustrates a flow chart of a second exemplary process for generating sequence generating factors in accordance with the principles of the invention.

FIG. 2 illustrates a flow chart of a second exemplary process 200 determining parameter values $p_1$ and $p_2$ of modulus value N in accordance with another aspect of the principles of the present invention. In this exemplary process, a size, referred to as |q|, is selected with regard to values, referred to as $q_1$ and $q_2$, at block 210. At block 215, a value for $q_1$, for example, is randomly selected. At block 220, a determination is made whether $p_1$ is a Sophie Germain number by determining whether $q_1$ and $p_1 = 2q_1 + 1$ are prime numbers. If the answer is negative, then processing proceeds to block 115 to select a new value for $q_1$.

However, if the answer is in the affirmative, then a determination is made at block 225 whether the factorization of $(q_1 - 1)$, i.e., the prime factors that make up the number $(q_1 - 1)$, can be determined. Factorization is well known in the art and need not be discussed in detail herein. If the answer is negative, then processing proceeds to block 115 to select a new value for $q_1$.

Otherwise, a value for second number $q_2$ is selected at block 230. At block 235, a determination is made whether the selected value of $q_2$ is the same as the value of $q_1$. If the answer is in the affirmative, then a new value of $q_2$ is selected at block 230. However, if the answer is negative, then a determination is made, at block 240, whether $p_2$ is a Sophie Germain prime number by determining whether $q_2$ and $p_1 = 2q_2 + 1$ are prime numbers.

If the answer is negative, then a new value of $q_2$ is selected at block 230. However, if the answer is in the affirmative, then a determination is made at block 245, whether the factorization of $(q_2 - 1)$ is known. If the answer is negative, then a new value of $q_2$ is selected at block 230.

Otherwise, the multiplicative order of 2 mod $(q_1 q_2)$, referred to as "ORD", is determined at block 250. At block 255, the value of modulus N is determined as a function of $p_1$ and $p_2$. At block 260, a determination is made whether the size of ORD, i.e., |ORD|, is greater than 90 percent of the size of N, i.e., |N|. If the answer is in the negative, then processing continues to block 215 to select new value for $s_1$.

Otherwise a root value, g, of size |q| is selected randomly at block 265. In a preferred embodiment the value of g is selected such that $(g^3 - g)$ is co-prime to N.

In a preferred embodiment of the invention, integers $q_1$ and $q_2$ are selected to satisfy the condition that the period of the sequence $2^i \mod (q_1 q_2)$ exceeds $2^{900}$. Selecting $q_1$ and $q_2$ in this manner is advantageous as it provides for protection against cycle attacks. Furthermore, when g is selected such that (g3−g) is co-prime to N, then the period of the underlying sequence exceeds $2^{900}$ and the first 900 terms of a Garay and Jakobsson time-line sequence shown in equation 1 are distinct.

Figure 3:
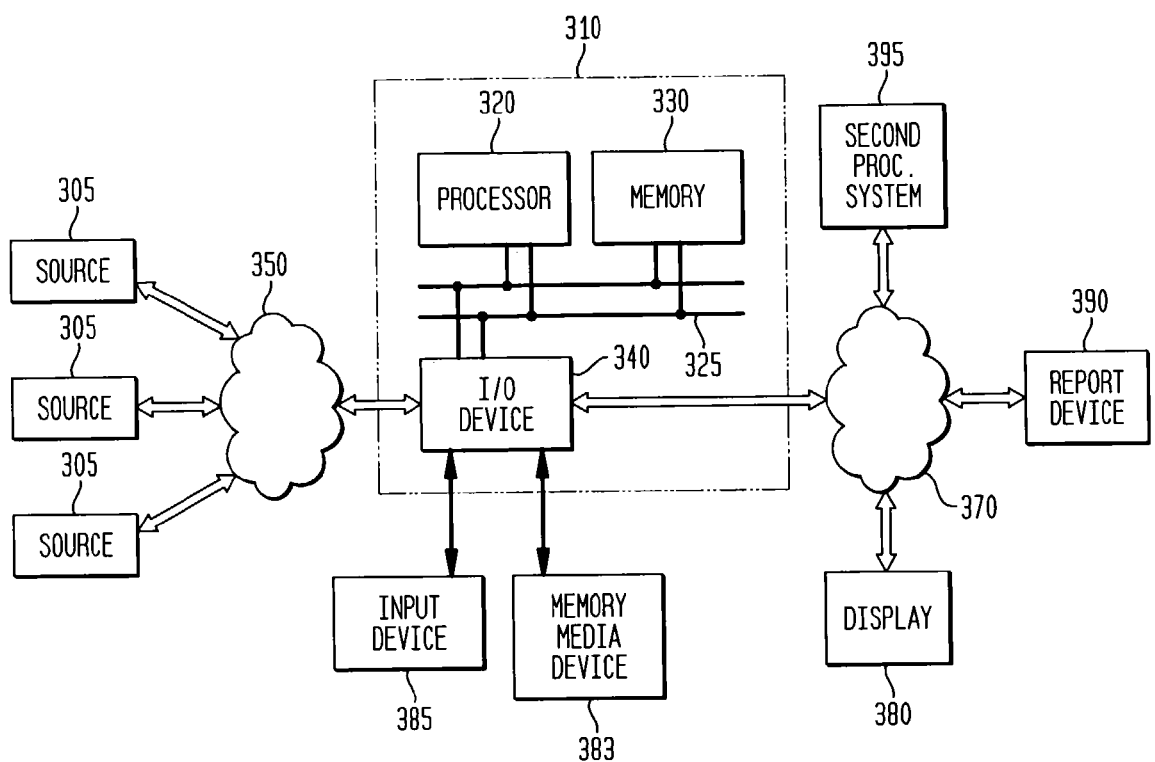
FIG. 3 illustrates a system for executing the processing shown in FIGS. 1 and 2.

FIG. 3 illustrates a system 300 for implementing the principles of the invention as depicted in the exemplary processing shown in FIGS. 1 and 2. In this exemplary system embodiment 300, input data is received from sources 305 over network 350 and is processed in accordance with one or more software programs executed by processing system 310. The results of processing system 310 may then be transmitted over network 370 for viewing on display 380, reporting device 390 and/or a second processing system 395.

Specifically, processing system 310 may be representative of a handheld calculator, special purpose or general purpose processing system, desktop computer, laptop computer, palm computer, or personal digital assistant (PDA) device, etc., as well as portions or combinations of these and other devices that can perform the operations illustrated in FIGS. 1 and 2 and includes one or more input/output devices 340 that receive data from the illustrated source devices 305 over network 350. The received data is then applied to processor 320, which is in communication with input/output device 340 and memory 330. Input/output devices 340, processor 320 and memory 330 may communicate over a communication medium 325. Communication medium 325 may represent a communication network, e.g., ISA, PCI, PCM-CIA bus, one or more internal connections of a circuit, circuit card or other device, as well as portions and combinations of these and other communication media.

In one embodiment, processor 320 may include code which, when executed, performs the operations illustrated herein. The code may be contained in memory 330, read or downloaded from a memory medium such as a CD-ROM or floppy disk represented as 383, or provided by manual input device 385, such as a keyboard or a keypad entry, or read from a magnetic or optical medium (not shown) which is accessible by processor 320, when needed. Information items provided by input device 383, 385 and/or magnetic medium may be accessible to processor 320 through input/output device 340, as shown. Further, the data received by input/output device 340 may be immediately accessible by processor 320 or may be stored in memory 330. Processor 320 may further provide the results of the processing shown herein to display 380, recording device 390 or a second processing unit 395 through I/O device 340.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operation illustrated in FIGS. 1 and 2 may be performed sequentially or in parallel using different processors to determine specific values. Processor system 310 may also be in two-way communication with each of the sources 305. Processor system 310 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 350 and 370 may also be internal networks, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, although the present invention has been disclosed with regard to digital signatures, it would be recognized by those skilled in the art that the present invention may be used with any information that a user may desire to keep secret until appropriate assurances from the receiving party are available. Thus, the present invention is suitable for electronic transfers of information associated with all basic types of e-commerce transactions, including electronic payment (e.g., exchanging an item such as a movie for an "e-coin"), electronic contract signing or, more generally, exchange of digital signatures on any type of data, etc. It is expressly intended that all combinations of those elements that perform substantially the same function in substantially the same way to achieve the same results are within the scope of the invention. Substitutions of elements from one described embodiment to another are also fully intended and contemplated.

We claim:

1. A method for conducting a timed cryptography procedure, comprising:
generating a succession of sequence values by successive exponentiations according to sequence parameters, of a root value, with a modulus value, over a number of said exponentiations equal to an order value, wherein the succession of sequence values have a sequence period;
wherein the modulus value of the sequence values is a product of a pair of values that are non-equal prime numbers of a known size, whereby the sequence period is elongated; and,
transmitting the sequence values over the number of exponentiations equal to the order value, thereby completing the timed cryptography procedure.

2. The method as recited in claim 1, wherein each of said pair of values is a safe prime number.

3. The method as recited in claim 1, wherein each of said pair of values is generated from a Sophie Germain prime number.

4. The method as recited in claim 1, further comprising providing a random number less than the modulus value, and selecting said root value to equal the random number.

5. The method as recited in claim 1, further comprising selecting said root value and said modulus value such that a cube of the root value, less the root value, is co-prime to said modulus value.

6. The method as recited in claim 2, wherein said each of said pair of values is a layered safe number.

7. The method as recited in claim 1, wherein each of said pair of values is congruent to 3, modulo 4.

8. The method as recited in claim 1, wherein said order value is selected to be at least 80.

9. A system for conducting a timed cryptography procedure, comprising:
a programmed processor coupled to a memory, said processor operable to generate a succession of sequence values by successive exponentiations according to sequence parameters, of a root value, with a modulus value, over a number of said exponentiations equal to an order value, wherein the succession of sequence values have a sequence period;
wherein the modulus value of the sequence values is a product of a pair of values that are non-equal prime numbers of a known size, whereby the sequence period is elongated; and,
transmitting the sequence values over the number of exponentiations equal to the order value, thereby completing the timed cryptography procedure.

* * * * *